United States Patent [19]
Lal et al.

[11] Patent Number: 5,738,945
[45] Date of Patent: Apr. 14, 1998

[54] MULTILAYER MAGNETIC MEDIUM WITH SOFT MAGNETIC INTERLAYER

[75] Inventors: Brij B. Lal, San Jose; Tadashi Shinohara, Freemont, both of Calif.

[73] Assignee: HMT Technology Corporation, Fremont, Calif.

[21] Appl. No.: 168,871

[22] Filed: Dec. 16, 1993

[51] Int. Cl.$^6$ ............................................. G11B 5/66
[52] U.S. Cl. ................... 428/611; 428/212; 428/216; 428/336; 428/635; 428/667; 428/678; 428/680; 428/681; 428/694 T; 428/694 TM; 428/694 TS; 428/694 TP; 428/900; 428/408
[58] Field of Search ..................... 428/694 T, 694 TM, 428/694 TS, 694 TP, 336, 635, 667, 678, 680, 681, 611, 212, 216, 900, 408; 204/192.1, 192.2

[56] References Cited

U.S. PATENT DOCUMENTS

| | | | |
|---|---|---|---|
| 4,610,935 | 9/1986 | Kumasaka et al. | 428/632 |
| 5,041,922 | 8/1991 | Wood et al. | 360/55 |
| 5,122,423 | 6/1992 | Hase et al. | 428/694 TF |
| 5,147,732 | 9/1992 | Shiroishi et al. | 428/668 |
| 5,232,750 | 8/1993 | Onodera et al. | 427/560 |
| 5,316,631 | 5/1994 | Ando et al. | 204/192.2 |
| 5,462,796 | 10/1995 | Teng et al. | 428/336 |

OTHER PUBLICATIONS

Hata, H., et al., "Magnetic and Recording Characteristics of Multilayer CoNiCr Thin Film Media," *IEEE Transactions on Magnetics* 26(5): 2709–2711 (Sep. 1990).

Hata, H., et al., "Low–noise media using double–layer CoNiCr thin films for longitudinal recording," *J. Appl. Phys.* 67(9): 4692–4694 (May 1990).

Lambert, S.E., et al., "Reduction of Media Noise In Thin Film Metal Media By Lamination," *IEEE Transactions on Magnetics* 26(5): 2706–2708 (Sep. 1990).

Sanders, I.L., et al., "Magnetic and Recording Characteristics of Very Thin Metal–Film Media," *IEEE Transactions on Magnetics* 25(5): 3869–3871 (Sep. 1989).

*Primary Examiner*—Stevan A. Resan
*Attorney, Agent, or Firm*—Judy M. Mohr; Peter J. Dehlinger

[57] ABSTRACT

A low-noise, thin-film magnetic recording medium, and method of making the same, are disclosed. The medium has a multilayer magnetic-film construction, where the individual magnetic-film layers are isolated by a thin ferromagnetic film. The ferromagnetic layer is effective to reduce the medium noise and increase medium signal-to-noise ratio at least as much as a Cr isolation having the same isolation-layer thickness, but with substantially less reduction in overwrite.

7 Claims, 7 Drawing Sheets

MULTILAYER MAGNETIC MEDIUM WITH SOFT MAGNETIC INTERLAYER

FIELD OF THE INVENTION

The present invention relates to a thin-film, multilayered longitudinal recording medium, and to a method of producing the same.

REFERENCES

Hata, H. et al., *J. Appl. Phys.*, 67(9): 4692 (1990a).

Hata, H. et al., *IEEE Transactions on Magnetics*, 26(5): 2709 (1990b).

Lambert, S. E., et al., *IEEE Transactions on Magnetics*, 26(5): 2706 (1990).

Sanders, I. L. et al., *IEEE Transactions on Magnetics*, 25(5): 3869 (1989).

BACKGROUND OF THE INVENTION

Thin-film magnetic recording media are often multilayered, consisting typically of a substrate, an underlayer, and a magnetic recording layer, although other layers such as an overcoat or various sublayers may be included. An ideal thin-film recording medium would have a high signal-to-noise ratio (SNR), high coercivity, low bit-shift, and good overwrite characteristics.

One of the parameters that can influence the magnetic properties and the recording characteristics of the medium is the thickness of the layers in the magnetic recording medium, in particular the underlayer and magnetic recording layer thicknesses. Media with a Co-based magnetic recording layer have been shown to exhibit improved signal-to-noise characteristics as the recording layer decreases in thickness (Lambert, Sanders).

The improvement in signal-to-noise ratio with decreasing magnetic recording layer thickness is due to a reduction in media noise (Sanders) and two mechanisms have been proposed to explain this result. First, thinner films have a less tightly packed grain structure in the initial growth layer of the magnetic film. Second, inter-granular exchange coupling is reduced in thinner films (Sanders).

However, as the magnetic recording layer decreases in thickness, other magnetic recording properties are compromised. For example, the signal amplitude is reduced in proportion to film thickness (Lambert). A thinner magnetic recording layer may provide insufficient amplitude of readback signal because of its low remanence thickness product (Hata 1990a). Additionally, the overwrite properties of the medium suffer as the thickness of the magnetic recording layer decreases.

Thus, the advantages in reducing the thickness of the magnetic recording layer, namely an improvement in media noise, must be balanced with the disadvantages, such as a reduced signal amplitude and poor overwrite.

One approach that has been proposed for overcoming this limitation has been to prepare multilayer laminated thin-film media (Hata 1990a, 1990b, Lambert). In these structures, thin films of the magnetic recording layer are deposited sequentially, each separated by a chromium interlayer. This multilayered configuration preserves the low noise characteristics of a thin magnetic recording layer, but has the signal amplitude characteristics related to the combined thickness of the individual thin magnetic layers.

However, a limitation of multilayer laminated structures of this type is reduced overwrite characteristics. Table 1 shows recording properties measured at the outer diameter of a 95 mm disc with radius 1.659 inches and at 8.5 MHz for a single layer Co/Cr/Ta recording media (0 Å Cr interlayer) and for a multilayer laminated recording media having two Co/Cr/Ta magnetic recording layers separated by a Cr interlayer of either 14 or 25 Å. There is little change in the signal-to-noise ratio when the Cr interlayer is present; however, there is a 25% reduction in overwrite. Both the bit-shift and the pulse width ($PW_{50}$) increase somewhat with addition of the Cr interlayer.

TABLE 1

Recording properties of laminated media having two thin magnetic recording layers (Co/Cr/Ta) separated by Cr interlayer.

| Recording Property | Thickness of Cr interlayer (Å) | | |
|---|---|---|---|
| | 0 | 14 | 25 |
| Signal-to-noise (dB) | 30.3 | 28.7 | 28.3 |
| Overwrite (-dB) | 26.3 | 22.3 | 19.7 |
| PW 50 (ns) | 59.1 | 58.9 | 61.5 |
| bit shift (ns) | 4.5 | 6.0 | 6.3 |

SUMMARY OF THE INVENTION

The invention includes, in one aspect, a thin-film, multilayer longitudinal magnetic recording medium having improved noise, signal-to-noise, and overwrite properties. The medium includes a substrate, and formed thereon, successively sputtered layers that include (i) a chromium underlayer; (ii) a first Co-based thin-film magnetic layer; (iii) a ferromagnetic isolation layer having a thickness between about 5–50 Å; (iv) a second Co-based thin-film magnetic layer; and a wear-resistant overcoat.

According to an important feature of the invention, the isolation layer is effective to reduce the noise and increase the signal-to-noise ratio of the medium at least as much as a Cr isolation having the same isolation-layer thickness, but with substantially less reduction in overwrite with respect to that produced by a Cr isolation layer.

In a preferred embodiment, the isolation layer is composed of a nickel/iron alloy, and has a thickness less than about 25 Å. Also in a preferred embodiment, the isolation layer is effective to decrease the $PW_{50}$ characteristics of the medium substantially more than does a Cr isolation layer of the same thickness.

The medium additionally may have a ferromagnetic overlayer, preferably between about 20–60 Å thick, disposed between the upper magnetic layer and carbon overcoat, to enhance the magnetic remanence and to reduce the spacing loss of the medium.

The medium is produced, in accordance with another aspect of the invention, by sputtering successively onto a substrate: (i) a chromium underlayer; (ii) a first Co-based thin-film magnetic layer; (iii) a ferromagnetic isolation layer having a thickness between about 5–50 Å; (iv) a second Co-based thin-film magnetic layer; and (v) a wear-resistant overcoat. The sputtering of the ferromagnetic isolation layer is effective to reduce the noise and increase the signal-to-noise ratio of the medium at least as much as is achieved by sputtering a Cr isolation to the same isolation-layer thickness, but with substantially less reduction in overwrite with respect to that produced by sputtering the same-thickness Cr isolation layer.

These and other objects and features of the invention will be more fully appreciated when the following detailed description of the invention is read in conjunction with the accompanying drawings.

BRIEF DESCRIPTION OF THE DRAWINGS

FIGS. 11A and 11B are cross-sectional views of a region in a multilayer magnetic recording media, showing the magnetic transition regions and the poles in a read-write head used in detecting the stored magnetic signal in the transition region, where FIG. 11A shows a medium having two magnetic recording layers separated by an isolation layer and FIG. 11B shows a medium having two isolation layers, one separating the magnetic recording layers and the second between the upper magnetic recording layer and the carbon overcoat.

DETAILED DESCRIPTION OF THE INVENTION

I. Thin-Film Medium

Figure 1:
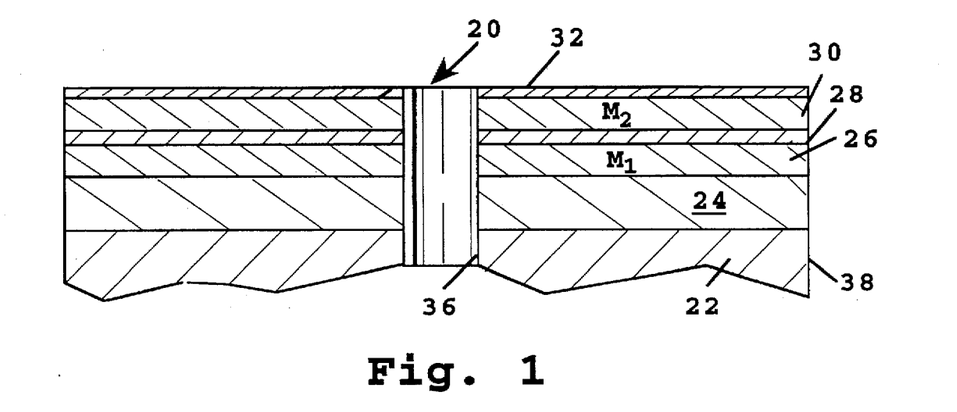
FIG. 1 is a cross sectional view of a multilayer magnetic recording medium formed in accordance with the invention.

FIG. 1 shows in cross sectional view, a fragmentary portion of a longitudinal thin-film medium or disc 20 formed in accordance with one embodiment of the invention. The disc generally includes a rigid substrate 22, and forming successive thin-film layers over the substrate, a crystalline underlayer 24, a first magnetic (M1) thin-film layer 26, an isolation layer 28, a second magnetic (M2) thin-film recording layer 30, and a protective carbon overcoat 32. It will be appreciated that the disc is symmetrical with respect to its upper and lower surfaces, the lower portion of the disc not being shown in the figure.

The substrate 22 may be a textured substrate, such as a conventional surface coated textured aluminum magnesium alloy base with an electroless-plated layer of nickel and phosphorus, or a textured glass, glass-ceramic, or ceramic substrate. An example of a glass-ceramic substrate is a canasite™ substrate available from Corning Glass (Corning, N.Y.). Such substrates typically have a thickness of about 1.27 mm for a 95 mm disc, and conventional testing is done at ID/OD values of about 0.8 inch and 1.78 inch, respectively. A non-metallic substrate may also include a metal sublayer, such as a Ti, Cr, or Cr-alloy sublayer.

Two conventional size substrates have outer diameters of 130 and 95 mm (5.1 and 3.74 inches), with corresponding inner diameters of 40 and 25 mm (1.57 and 0.98 inches), respectively. The discs used for the preferred embodiment of the present invention have inner diameters of 0.984 inches and outer diameters of 3.74 inches. The inner and outer edges of the disc which define these diameters are indicated at 36, 38, respectively, in FIG. 1.

The crystalline underlayer 24 is preferably a sputtered chromium underlayer having a thickness between about 100–3000 Å. Chromium containing alloys, such as CrV, CrGd and CrSi may also be suitable as the underlayer. Magnetic thin-film layers 26, 30 are formed by sputtering a target alloy composed of a Co-based alloy such as a Co/Cr or Co/Ni binary alloy, or a Co/Cr or Co/Ni based alloy, i.e., an alloy in which the binary elements constitute about 80 atomic percent or more of the alloy. Exemplary alloys include Co/Cr/Ta, Co/Ni/Pt or Co/Ni/Cr ternary alloy, or a Co/Cr/Ta/Pt or Co/Ni/Cr/Pt quaternary alloy. One preferred magnetic thin film alloy is composed of 80–90 percent Co, 5–15 atom percent Cr, and 2–5 atom percent Ta. These alloys are characterized by high-coercivity, high magnetic remanence, and low permeability, and are well-known for use in thin-film longitudinal recording media.

The isolation layer 28 is formed of a soft ferromagnetic material, such as an iron/nickel alloy (permalloy), iron/silicon/aluminum (Sendust), or iron-nitride alloy. The material is characterized by high magnetic permeability, preferably greater than about 1,000, and low coercivity, preferably less than 10 Oe. The isolation layer has a thickness of at least 5 Å, but preferably less than 60 Å. As will be seen below, this thickness range, and preferably a thickness range between about 5–25 Å, is effective to reduce the noise and to increase the signal-to-noise ratio of the medium at least as much as a Cr isolation layer having the same isolation-layer thickness, but with substantially less reduction in overwrite with respect to that produced by a Cr isolation layer.

In another embodiment (not shown), the medium has a ferromagnetic keeper layer disposed between the upper magnetic layer M2 and the carbon overcoat. This additional layer, preferably between about 20–60 Å thick, is effective to enhance the magnetic remanence and to reduce the spacing loss of the medium.

Carbon overcoat 32 in the multi-layer medium is preferably a carbon layer formed by sputtering carbon under conditions in which the carbon is in a predominantly diamond-like structure. The overcoat thickness is preferably between about 100 and 300 Å.

II. Method of Producing the Medium

Figure 2:
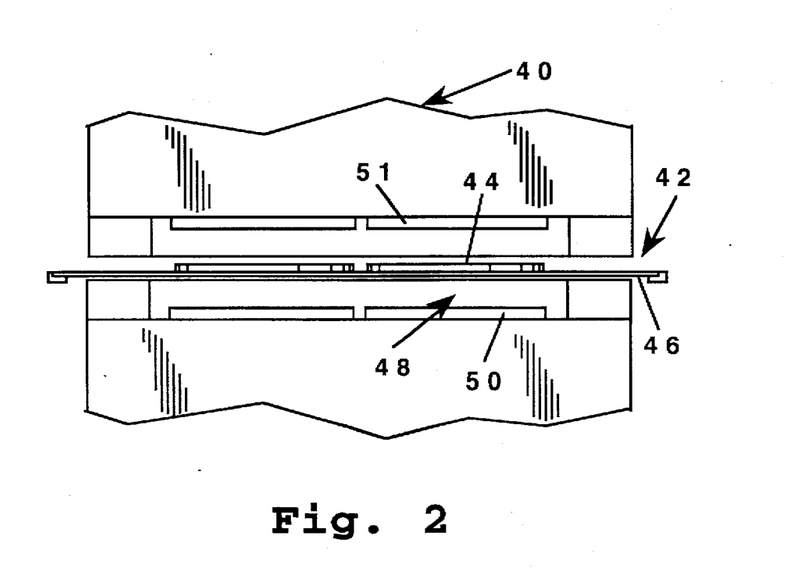
FIG. 2 is a schematic view of a sputtering apparatus used in producing the thin-film medium of the invention.

FIG. 2 shows, in schematic view, a portion of a sputtering apparatus 40 which is used, in the method of the invention, for producing the multilayer medium described in Section I. The method will be described with reference to forming the medium illustrated in FIG. 1.

Apparatus 40 includes a vacuum chamber 42 having at least four stations at which sputtering or heating operations occur. A heating station (not shown) at the upstream end of the chamber has a plurality of infrared lights which are arrayed for heating both sides of a substrate, such as substrate 44, carried through the station in the chamber on an disc holder or pallet 46.

Just downstream of the heating station is a first sputtering station 48 at which the chromium underlayer is formed on a substrate, in a manner to be described. The station includes a pair of targets, such as target 50, effective to sputter chromium onto opposite sides of a substrate. The targets in station 48 are preferably pure chromium targets, or chromium alloys containing predominately chromium.

A second sputtering station (not shown) downstream of chamber 48 is used for sputtering the first magnetic thin-film layer M1 over the underlayer. The targets used at this sputtering station have a selected Co-based alloy composition noted above suitable for forming a thin-film magnetic recording layer.

A third sputtering station (not shown), also like station 48, provides targets for sputtering the ferromagnetic isolation layer over the first magnetic thin-film layer. The targets in this station are formed of the ferromagnetic materials discussed above. The ferromagnetic isolation layer is sputtered to a thickness between about 5–25 Å. Methods for controlling the thickness of sputtered films in a conventional sputtering apparatus are well known.

The upper magnetic recording layer (M2) is deposited onto the isolation layer in another sputtering station (not shown in FIG. 2) similar to the second station used to form layer M1, discussed above.

The carbon overcoat in the medium is produced by sputtering from a graphite target in a final sputtering station (not shown) in the apparatus.

The basic sputtering apparatus is preferably a commercial system, such as in available from Varian (Santa Clara, Calif.), Circuits Processing Apparatus (Fremont, Calif.), ULVAC (Japan), Leybald Heraeus (Germany), VACTEC (Boulder, Colo.), or Materials Research Corporation (Albany, N.Y.). These systems are double-sided, in-line, high-throughput machines having two interlocking systems, for loading and unloading. In operation, the sputtering chamber is evacuated to pressure of about $10^{-7}$ Torr, and argon gas is introduced into the chamber to a final sputtering pressure of 2–20 Mtorr. The substrate is heated in the heating station to a selected temperature before advancing into the sputtering chambers. The heating conditions in the apparatus are preferably adjusted to achieve a preferred substrate temperature of between about 100° C. and 300° C., although temperatures below 100° C. may also be employed.

The heated substrate is moved into the first sputtering station and the chromium underlayer is sputtered onto the textured disk surface. It is desirable that the chromium layer be deposited so that it has a high anisotropic parallel/perpendicular crystal orientation ratio. This anisotropy is important in establishing desired magnetic properties. Sputtering voltage and deposition rates which favor the formation of anisotropy are known to those skilled in the art.

The chromium underlayer is deposited to a thickness of between about 100–3000 Å. The thickness is controlled by conventional sputter deposition parameters, such as sputter pressure, target power, voltage, deposition time, etc. These parameters are adjusted, conventionally, to achieve the desired underlayer thickness. The magnetic recording properties, such as HF and LF signal amplitude, bit shift, overwrite and signal-to-noise ratio vary according to the thickness of the chromium underlayer.

After formation of the underlayer, the substrate is moved downstream on a disc holder into the second sputtering chamber, where the first thin-film magnetic recording layer is sputtered onto the under-layer. The magnetic recording layer is sputtered onto the underlayer under conditions similar to those described above. The thickness of the thin-film magnetic recording layer is preferably between about 100–800 Å, and more preferably 400–800 Å.

The substrate is moved downstream on a disc holder into the next sputtering chamber, where the soft ferromagnetic isolation layer is sputtered onto the first thin-film magnetic recording layer. The isolation layer is sputtered at a pressure and temperature similar to those specified above for formation of the magnetic recording layer.

The substrate is then carried on the disc holder toward another sputtering station where the second magnetic recording layer is deposited over the isolation layer. Following this, a carbon overcoat is applied in another sputtering station according to conventional sputtering methods.

III. Media Properties

Bulk magnetic properties were determined by vibrating sample magnetometry (VSM) conventionally. Magnetic recording testing was carried out on a zero-bias Guzik Model RWA 221, using a thin-film inductive reading and recording head with a gap length of 14 μin., a gap width of 472 μin., and a flying height of 4.5 μin. The head inductance was 1.1 μHenry and resistance, 30 ohms. Recording current was 25–30 mAmps for saturation. The AC-SNR was measured at linear densities between 10 and 70 kiloflux changes/inch.

In the studies reported below, media were prepared as follows: An aluminum substrate (with a nickel/phosphorus coating) (95 mm) was heated to 270° C., and a sputtered Cr sublayer having a thickness of 650 Å was deposited. The coated substrate was positioned in a second sputtering station to form a first CoCrTa thin-film magnetic recording layer. A ferromagnetic isolation film of NiFe was then sputtered onto the first magnetic recording layer, to a selected thickness. A second magnetic recording layer (Co/Cr/Ta) was sputtered over the isolation layer, followed by a 175 Å carbon overcoat.

Figure 3:
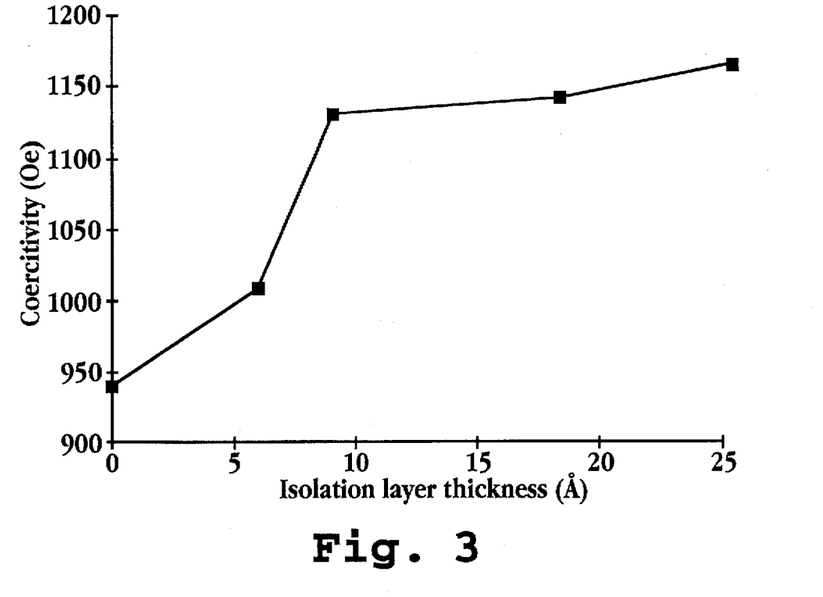
FIG. 3 is a plot of coercivity in Oersteds as a function of thickness of the isolation layer, in Å.

FIG. 3 shows the effect of thickness of the NiFe isolation layer on the coercivity of the multilayer medium. The coercivity increases as the isolation layer thickness increases, especially in the thickness range between 1–10 Å.

Figure 4:
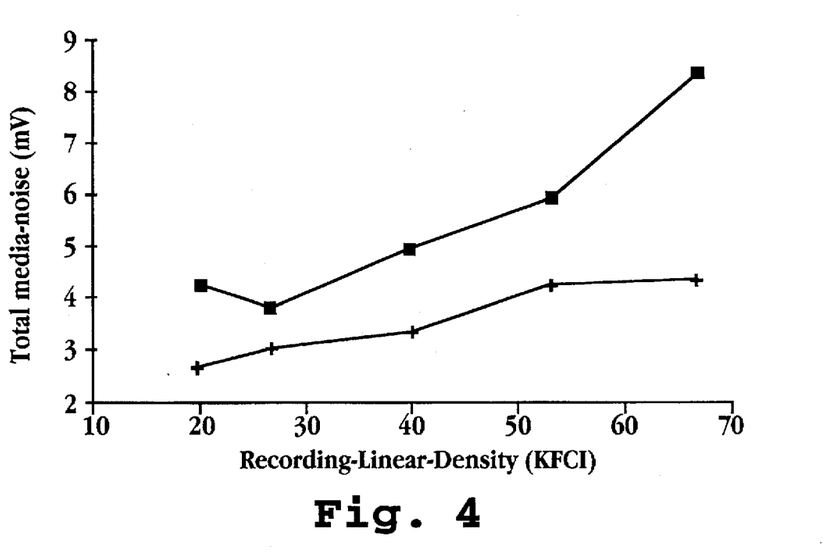
FIG. 4 is a plot of media noise in mV as a function of recording linear density, in kiloflux changes/inch, where the NiFe isolation layer is absent (0 Å, closed squares) and is 18 Å (+ symbols)

FIG. 4 shows the effect of an 18 Å isolation layer on total media noise as a function of recording density. Over the range of recording densities tested, the media noise for the magnetic recording media having an isolation layer (+ symbols) is reduced compared to a medium with no isolation layer (closed squares), that is a conventional single layer medium.

Figure 5:
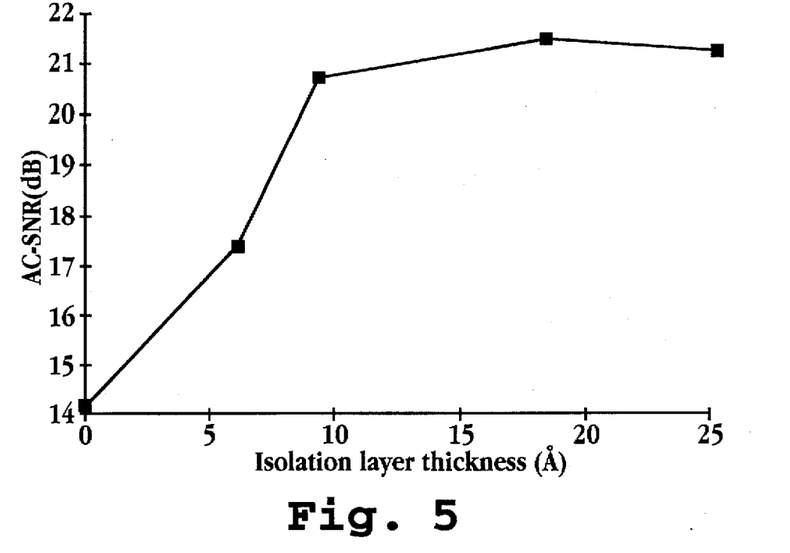
FIG. 5 is a plot of signal-to-noise ratio in dB as a function of thickness of the isolation layer in Å, measured at 66.3 kiloflux changes/inch.
Figure 6:
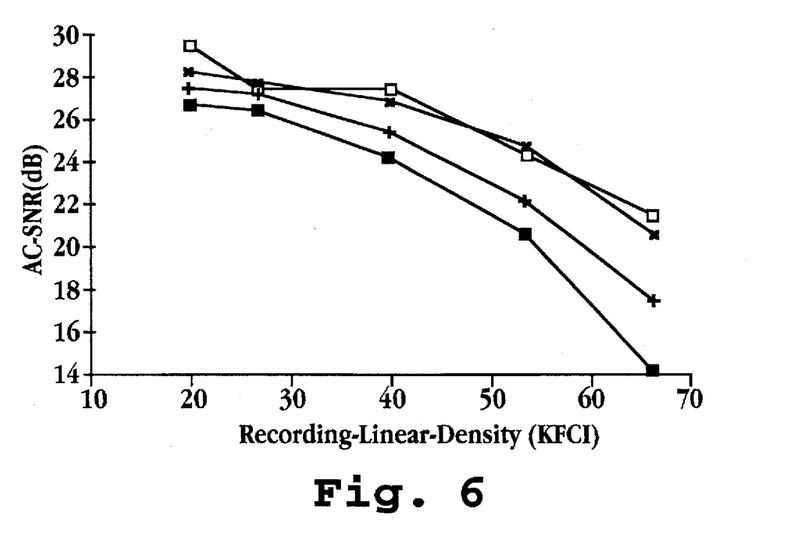
FIG. 6 is a plot of signal-to-noise ratio as a function of recording linear density in kiloflux changes/inch for media having no isolation layer (closed squares); and isolation layers of various thicknesses.

FIGS. 5 and 6 show the effect of the isolation layer on the signal-to-noise ratio. In FIG. 5, the signal-to-noise ratio increases as the thickness of the isolation layer increases, when measured at a recording density of 66.3 kiloflux changes/inch. In FIG. 6, the signal-to-noise ratio is shown as a function of recording density for media having isolation layers 6 Å, 9 Å, and 18 Å, in thickness as well as without an isolation layer (closed squares). Over the range tested, the presence of the isolation layer resulted in an increased signal-to-noise ratio relative to a medium with no isolation layer. The increase in signal-to-noise ratio was highest for the medium with an 18 Å thick isolation layer.

Figure 7:
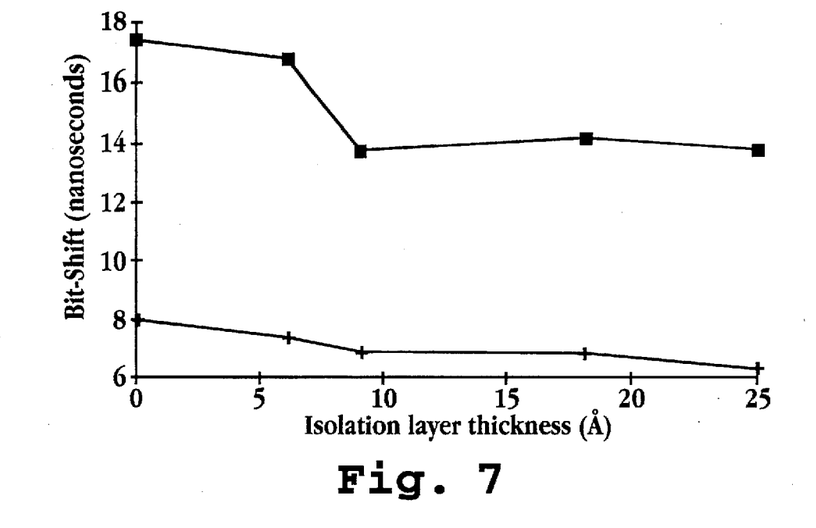
FIG. 7 is a plot of bit shift in nano-seconds measured at both the inner diameter (closed squares) and the outer diameter (+ symbols) as a function of thickness of the isolation layer in Å.

FIG. 7 shows the reduction in bit shift, measured at both the inner diameter, with radius of 0.950 inches, and the outer diameter, with radius of 1.659 inches, of the medium, as a function of isolation layer thickness. The reduction is more pronounced at the inner diameter, especially as the isolation layer increases in thickness from 1–10 Å.

Figure 8:
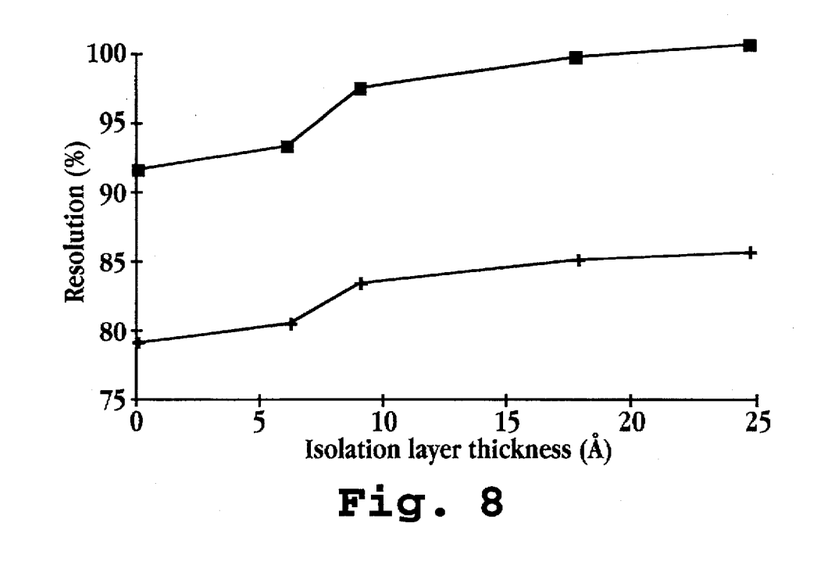
FIG. 8 shows the resolution in % at both the inner (closed squares) and outer (+ symbols) diameters of a medium as a function of thickness of the isolation layer in Å.

Resolution as a function of thickness of the isolation layer is shown in FIG. 8. Resolution was measured at both the inner diameter, with radius of 0.950 inches, and the outer diameter, with radius of 1.659 inches, and increases over the 0–25 Å thickness range tested.

Figure 9:
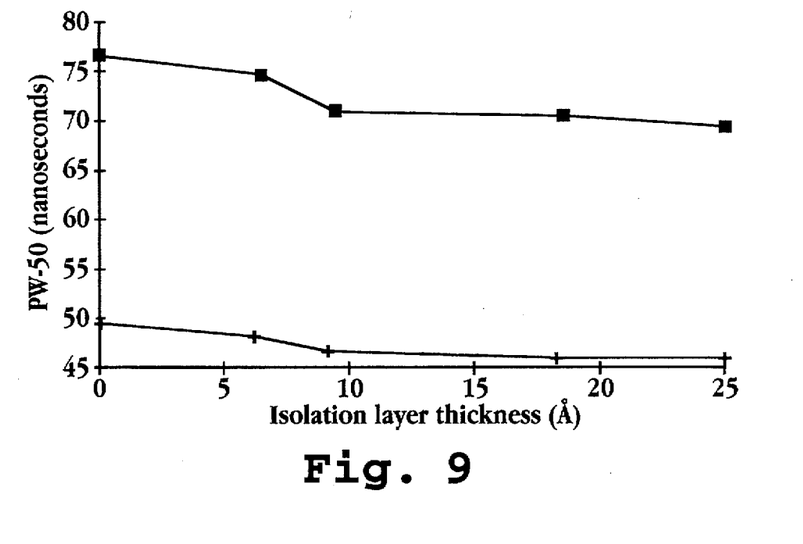
FIG. 9 shows $PW_{50}$ in nano-seconds measured at both the inner (closed squares) and outer (+ symbols) diameters as a function of thickness of the NiFe isolation layer in Å.

Pulse-width ($PW_{50}$), or the isolated readback pulse width measured at 50% of base to peak amplitude, as a function of isolation layer thickness is shown in FIG. 9. $PW_{50}$ decreases as the isolation layer increases in thickness, at both the inner diameter, with radius of 0.950 inches, and the outer diameter, with radius of 1.659 inches, of the disc.

Table 2 shows the parametrics for a magnetic recording medium prepared with a NiFe isolation layer. The medium consists of a Nip coated Al substrate, a Cr underlayer, a first and a second magnetic recording layer separated by a NiFe isolation layer and a carbon overcoat. Comparing the medium having no NiFe isolation layer (0 Å NiFe isolation layer thickness) to one having a 25 Å thick isolation layer, the overwrite characteristics of the medium remain essentially unchanged when the NiFe isolation layer is present. Additionally, there are favorable reductions in bit shift and in pulse width ($PW_{50}$) and an increase in resolution. This is in contrast to the data shown in Table 1 for a medium having a Cr isolation layer where a 25% reduction in overwrite was observed with no reduction in bit shift or in pulse width.

TABLE 2

OD Parametrics for a multi-layer recording medium having two thin-film magnetic recording layers separated by a NiFe isolation layer of varying thickness.

| Recording Parameter | Thickness of NiFe Isolation Layer (Å) | | | | |
| --- | --- | --- | --- | --- | --- |
|  | 0 | 6 | 9 | 18 | 25 |
| HF signal amplitude (uV) | 369 | 360 | 363 | 363 | 360 |
| Overwrite (dB) | 29 | 28.8 | 28.3 | 28.3 | 27.9 |
| Resolution (%) | 78.8 | 80.1 | 83.0 | 84.4 | 84.6 |
| Pulse width ($PW_{50}$) (ns) | 48.9 | 47.9 | 46.3 | 45.9 | 45.4 |
| bit shift (ns) | 8.0 | 7.3 | 6.8 | 6.7 | 6.2 |

Figure 10A:
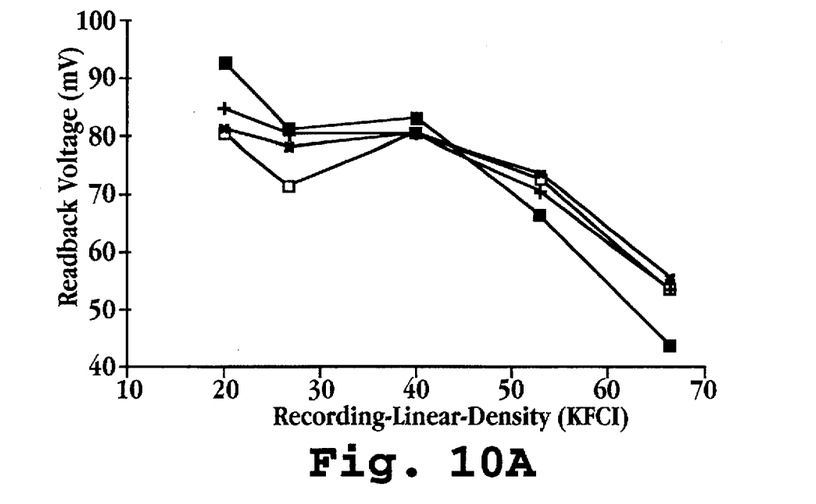
FIG. 10A shows readback voltage, in mV, as a function of recording linear density, in kiloflux changes/inch, for the multi-layered medium of the present invention having a NiFe isolation layer of varying thickness.
Figure 10B:
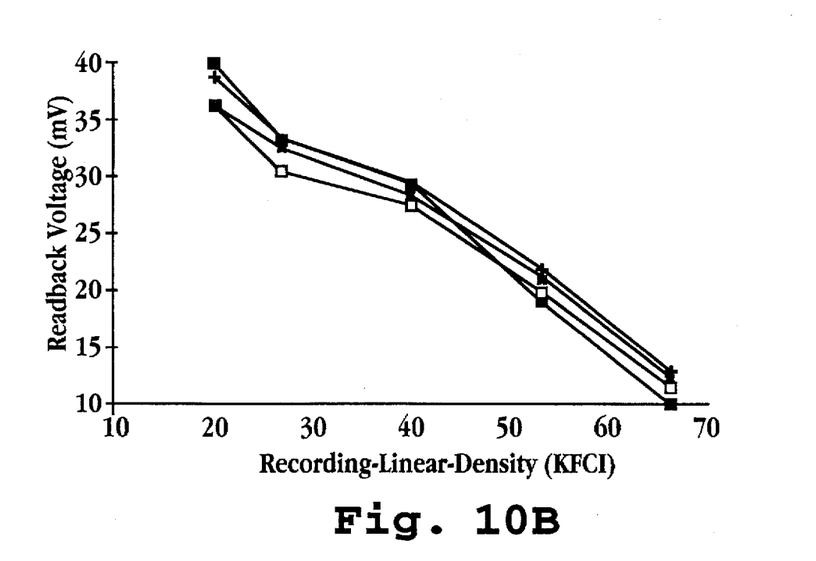
FIG. 10B shows readback voltage, in mV, as a function of recording linear density, in kiloflux changes/inch, for a multi-layered medium having a Cr isolation layer of varying thickness.

FIGS. 10A and B further illustrate the effectiveness of the NiFe isolation layer as compared to a Cr isolation layer. FIG. 10A shows the readback voltage in mV as a function of recording linear density, in kiloflux changes/inch, for a multilayered medium having a NiFe isolation layer, as described above. For comparison, FIG. 10B shows a similar plot for media having a Cr isolation layer. Both figures show the expected decreasing trend in readback voltage with increasing recording linear density. However, FIG. 10A, the medium with the NiFe isolation layer, has a higher relative value of readback voltage than does the medium with the Cr isolation layer, shown in FIG. 10B. This is especially of value at the higher recording linear densities, where most recording is done, to ensure a good signal. Also, the slope of the line, or the dependence of the readback voltage on the recording linear density, is significantly less for the media having a NiFe isolation layer.

Figure 11A:
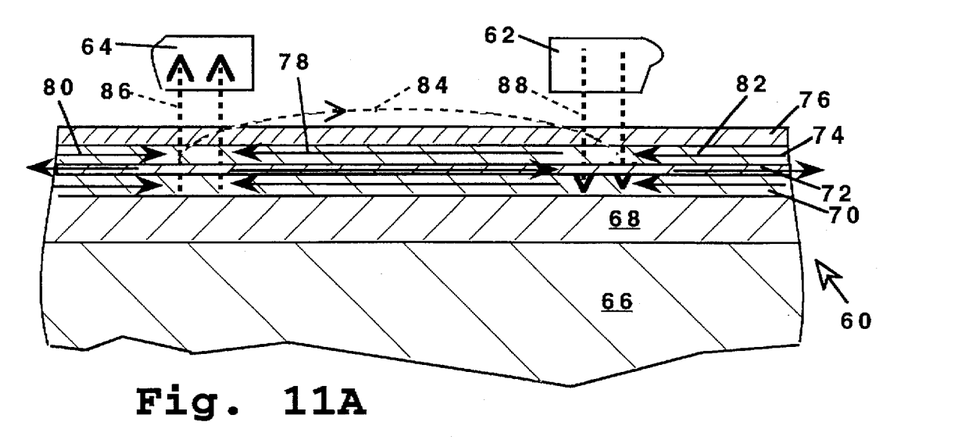
Figure 11B:
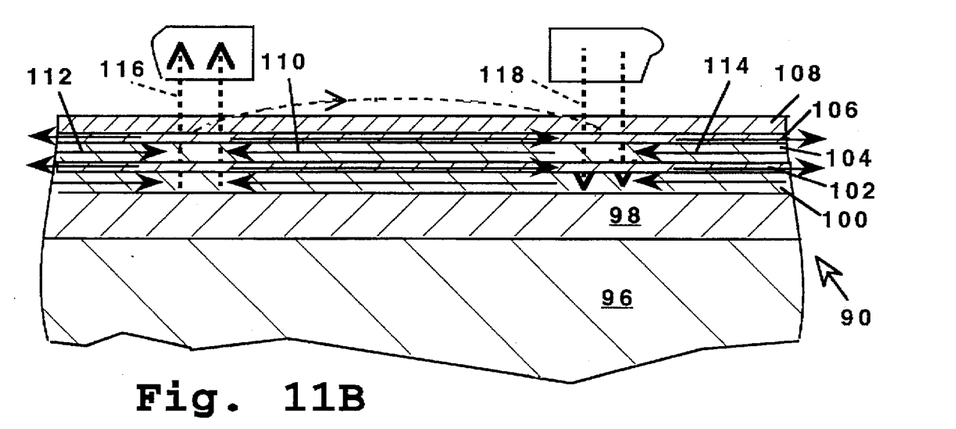

FIGS. 11A and 11B illustrate how the isolation layer functions to reduce the media noise and to reduce spacing flux losses during the read-write process, which results in the improved recording characteristics shown in Section III above.

FIG. 11A shows a transition region in a multi-layer thin-film medium 60 and the two poles 62, 64 of a zero-bias read-write head (not shown) used in reading data stored in the form of magnetic transitions on the medium.

The medium includes a substrate 66, a chromium underlayer 68, a first thin-film magnetic recording layer 70, a ferromagnetic isolation layer 72, a second thin-film magnetic recording layer 74 and a carbon overcoat. A representative transition regions in each of the magnetic recording layers 70, 72 is indicated by arrows, such as arrow 78 in the second magnetic layer. The arrows indicate the alignment of magnetic dipoles in the transition regions. Also shown are two adjacent transition regions in which the arrows also indicate the alignment of magnetic dipoles in their respective transition regions, such as arrows 80, 82 in the second magnetic recording layer.

As discussed above, thin media layers exhibit inherently better signal-to-noise ratio primarily due to a reduction in media noise. According to an important feature of the invention, the ferromagnetic isolation layer is effective to preserve the overwrite characteristics of the medium when compared to a similar medium having a Cr isolation layer of the same thickness.

A portion of the signal flux due to magnetic alignment in the transition region of the first magnetic recording layer is shunted by the ferromagnetic isolation layer 72, as indicated by the arrows in layer 72.

As seen in FIG. 11A, the aligned magnetic dipoles forming the transitions regions produce magnetic flux lines 84 extending above the medium surface between the two poles of the transducer head.

In a reading operation, the magnetic recording medium rotates below the transducer head, and the magnetic field in each transition region interacts with the spaced poles 62, 64, as indicated by dark dotted lines 86, 88 to induce a current in coil windings present in the transducer head, giving the signal. The flux 84, due to spacing loss, is not "captured" by the transducer head during the reading operation, reducing the signal amplitude.

FIG. 11B shows a transition region in a thin-film medium 80 according to another embodiment of the present invention. As in FIG. 11A, two poles 62, 64 of a read-write head (not shown) used in reading data stored in the form of magnetic transitions on the medium are also shown.

The medium of FIG. 11B includes a substrate 96, a chromium underlayer 98, a first thin-film magnetic recording layer 100, a first ferromagnetic isolation layer 102, a second thin-film magnetic recording layer 104, a ferromagnetic keeper layer 106, and a carbon overcoat 108. Seen here is a transition region, indicated by arrows in the magnetic recording layers, such as arrow 110 in the second magnetic layer 104, which show the alignment of magnetic dipoles in the transition region. Also shown are two adjacent regions in which the arrows 112, 114 also indicate the alignment of magnetic dipoles in the respective transition regions of the second magnetic layer. The first magnetic layer 100 has similar transition regions, also indicated by arrows.

As before, a portion of the signal flux due to magnetic alignment in the transition region of the first magnetic recording layer is shunted to the first ferromagnetic isolation layer 102, as indicated by the arrows in layer 102. This also occurs between the second magnetic recording layer 104 and the second isolation layer 106. Here, the second ferromagnetic isolation layer is thin enough to be saturated by the flux and effectively confines the signal flux to the magnetic thin-film layer, and spacing losses are reduced. This reduced spacing loss may contribute, along with the increased $M_r t$ of the medium, to a greater signal amplitude observed in the medium.

In addition, flux lines which are seen by the read-write head, indicated in FIG. 11B as 116, 118, are better defined at the two poles of the transition region, since stray spacing-loss flux has been reduced or eliminated.

Although the invention has been described with respect to particular embodiments, it will be apparent to those skilled in the art that various changes and modifications can be made without departing from the invention.

It is claimed:

1. A thin-film longitudinal magnetic recording medium comprising a substrate, and forming successive sputtered layers on the substrate:
(i) a chromium underlayer;
(ii) a first Co-based thin-film magnetic layer;
(iii) a soft ferromagnetic isolation layer having a thickness between about 5–50 Å;
(iv) a second Co-based thin-film magnetic layer; and a wear-resistant overcoat composed of carbon, said isolation layer being effective to reduce medium noise and increase medium signal-to-noise ratio at least as much as a Cr isolation layer having the same thickness, but with substantially less reduction in overwrite with respect to that produced by a Cr isolation layer.

2. The medium of claim 1, wherein said isolation layer has a thickness less than about 25 Å.

3. The medium of claim 1, wherein said isolation layer is composed of a nickel/iron alloy.

4. The medium of claim 1, wherein the isolation layer is further effective to reduce the $PW_{50}$ substantially more than is a Cr isolation layer having the same thickness.

5. The medium of claim 1, wherein the isolation layer is further effective to reduce the bit shift substantially more than is a Cr isolation layer having the same thickness.

6. The medium of claim 1, wherein the isolation layer is further effective to (i) increase the readback voltage, and (ii) decrease the dependence of readback voltage on recording linear density substantially more than is a Cr isolation layer having the same thickness.

7. The medium of claim 1, which further includes a ferromagnetic overlayer (i) disposed between said second magnetic layer and said overcoat, and (ii) having a layer thickness between about 20–60 Å.

* * * * *